United States Patent
Harvey et al.

[15] 3,669,994
[45] June 13, 1972

[54] ANTHRAQUINONE DYESTUFFS

[72] Inventors: Edwin Dennis Harvey, Manchester; Frank Lodge, Huddersfield, both of England

[73] Assignee: Imperial Chemical Industries Limited, London, England

[22] Filed: Jan. 6, 1970

[21] Appl. No.: 1,047

Related U.S. Application Data

[63] Continuation-in-part of Ser. No. 724,632, April 4, 1968, abandoned, which is a continuation-in-part of Ser. No. 436,381, March 1, 1965, abandoned.

[30] Foreign Application Priority Data

March 25, 1964 Great Britain.................12,680/64

[52] U.S. Cl..................................260/380, 8/39, 260/383, 8/40
[51] Int. Cl........................................C09b 1/50, C09b 1/54
[58] Field of Search..........................260/380, 383

[56] References Cited

UNITED STATES PATENTS

| | | | |
|---|---|---|---|
| 3,043,646 | 7/1962 | Buecheler | 260/380 X |
| 3,265,460 | 8/1966 | Hoare | 8/39 |
| 3,549,667 | 12/1970 | Wunderlich et al. | 260/380 |

*Primary Examiner*—Lorraine A. Weinberger
*Assistant Examiner*—Robert Gerstl
*Attorney*—Cushman, Darby & Cushman

[57] ABSTRACT

Mixtures of disperse anthraquinone dyestuffs which are obtained by reacting a leuco derivative of a 1:5-dihydroxy-4:8-di(amino, hydroxy or alkylamino) -2-(hydroxyaryl or alkoxyaryl)anthraquinone with an aldehyde, and the use of the said mixtures for coloring synthetic textile materials.

3 Claims, No Drawings

ANTHRAQUINONE DYESTUFFS

This application is a continuation-in-part of our application Ser. No. 724,632 which was filed in the United States Patent Office on Apr. 4, 1968 and which is now abandoned, and which was itself a continuation-in-part of our application Ser. No. 436,381 which was filed in the United States Patent Office on Mar. 1, 1965 and which is now abandoned.

This invention relates to mixtures of new water-insoluble anthraquinone dyestuffs which are valuable for coloring synthetic textile materials, in particular textile materials comprising polyester fibers.

According to the invention there are provided mixtures of water-insoluble anthraquinone dyestuffs of the formula:

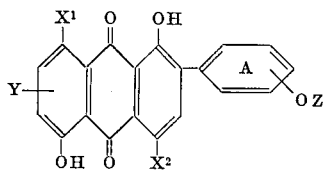

wherein $X^1$ and $X^2$ are independently selected from the class consisting of amino, hydroxy, and lower alkylamino;

Y is selected from the class consisting of lower alkyl, hydroxy lower alkyl, benzyl, hydroxybenzyl, lower alkylbenzyl, chlorobenzyl and lower alkoxybenzyl.

Z is selected from the class consisting of hydrogen, lower alkyl, hydroxy lower alkyl and lower alkoxy lower alkyl;

and any substituents on the benzene ring A are selected from the class consisting of chlorine and lower alkyl.

Throughout this specification the terms lower alkyl and lower alkoxy are used to denote alkyl and alkoxy radicals respectively containing from one to four carbon atoms.

As examples of the lower alkylamino groups represented by $X^1$ and $X^2$ there may be mentioned methylamino, ethylamino, n-propylamino and n-butylamino.

As examples of the groups represented by Y there may be mentioned methyl, ethyl, propyl, butyl, hydroxymethyl, β-hydroxyethyl, β- or γ-hydroxypropyl, β-(methoxy or ethoxy)-ethyl, β- or γ-(methoxy or ethoxy)propyl, o-, m- and p-hydroxybenzyl, o-,m- or p-methylbenzyl and o-, m- or p-methoxybenzyl.

As examples of the groups represented by Z there may be mentioned methyl, ethyl, propyl, butyl, β-hydroxyethyl, β- or γ-hydroxypropyl, β-(methoxy or ethoxy)ethyl and β- or γ-(methoxy or ethoxy) propyl. It is however preferred that Z represents a hydrogen atom or a lower alkyl radical.

It is preferred that the —OZ radical is attached to the benzene ring A in para position to the carbon atom which links the benzene ring to the anthraquinone nucleus.

The mixtures of the water-insoluble anthraquinone dyestuffs of the invention are obtained by treating a leuco derivative of an anthraquinone compound of the formula:

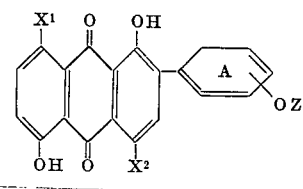

Formula I wherein A, $X^1$, $X^2$ and Z have the meanings stated above, with an aldehyde selected from the group consisting of formaldehyde, a lower alkanal, a lower hydroxy alkanal, benzaldehyde, a hydroxybenzaldehyde, chlorobenzaldehyde, a lower alkyl benzaldehyde and a lower alkoxy benzaldehyde.

The treatment of the leuco compound with the aldehyde is carried out by stirring the reactants together in water, or in a mixture of water and a water-miscible organic liquid, preferably at a temperature between 0° and the boiling point of the reaction mixture. At the conclusion of the reaction the dyestuff which is precipitated, if necessary after adding an acid such as acetic acid, is filtered off and dried. The reaction is preferably carried out in the presence of an alkaline agent such as sodium hydroxide, so that the pH of the reaction mixture is preferably maintained between 9 and 13. Since the said leuco compounds are susceptible to atmospheric oxidation it is also preferred to carry out the reaction in an inert atmosphere, for example in an atmosphere of nitrogen.

The reaction of the leuco compound with the aldehyde is quite rapid, and it has been found that times of reaction in the range of 10 minutes to 3 hours are sufficient to ensure complete reaction of all of the leuco derivative. When starting from leuco derivatives of compounds of Formula I wherein at least one of $X^1$ and $X^2$ is amino, it is found that a part of the said amino group or groups is simultaneously converted to a hydroxy group or groups as the reaction proceeds and this part gradually increases as the reaction time is extended.

In carrying out the reaction it is necessary to use at least one molecular proportion of aldehyde for each molecular proportion of the leuco compound, and in general it is advisable to use between 1 and 5 molecular proportions of aldehyde for each molecular proportion of the leuco compound. However, it is usually found that the reaction proceeds satisfactorily with not more than 2.5 molecular proportions of aldehyde. While larger quantities of aldehyde can in fact be used, such large amounts do not result in increased yields and only add to the expense of the dyestuffs as, in general, it is difficult to recover the unconsumed aldehyde.

As specific examples of aldehydes there may be mentioned formaldehyde, acetaldehyde, propionaldehyde, benzaldehyde, hydroxybenzaldehydes, chlorobenzaldehydes, methylbenzaldehydes and methoxybenzaldehydes.

The leuco derivatives of the anthraquinone compounds of Formula I may themselves be obtained by methods which are known for the preparation of leuco derivatives of anthraquinone compounds, for example by treating the anthraquinone compounds of Formula I with sodium hydrosulphite and an alkali, such as sodium bicarbonate, sodium carbonate, or sodium hydroxide, in aqueous medium, preferably in an inert atmosphere.

When preparing the leuco derivatives of the anthraquinone compounds of Formula I wherein $X^1$ and/or $X^2$ represent amino or lower alkylamino groups it is generally found that these groups are simultaneously converted, either in whole or in part, to the hydroxy groups, so that the resulting leuco derivative usually comprises the leuco derivatives of a mixture of anthraquinone compounds of Formula I.

The anthraquinone compounds of Formula I may themselves be obtained by reacting a 4:8-di(hydroxy-, amino- or alkylamino)-1:5-dihydroxyanthraquinone-2:6-disulphonic acid with a compound of the formula

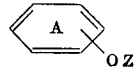

in sulphuric acid medium containing boric acid, heating the resulting product in a dilute aqueous acid solution to split off one of the sulphonic acid groups, and subsequently splitting off the other sulphonic acid group by treatment with a reducing agent followed by treatment with an oxidizing agent.

As specific examples of the anthraquinone compounds of Formula I there may be mentioned 4:8-diamino-1:5-dihydroxy-2-(4'-hydroxyphenyl)anthraquinone, 4:8-di(methylamino)-1:5-dihydroxy-2-(4'-hydroxyphenyl)anthraquinone, 4:8-di(ethylamino)-1:5-dihydroxy-2-(4'-hydroxyphenyl)anthraquinone, 4:8-diamino-1:5-dihydroxy-2-(4'-hydroxy-3'-methylphenyl)-anthraquinone and 4:8-diamino-1:5-dihydroxy-2-(4'-methoxyphenyl)anthraquinone.

A preferred class of the said mixtures of anthraquinone dyestuffs comprises mixtures of anthraquinone dyestuffs of the formula:

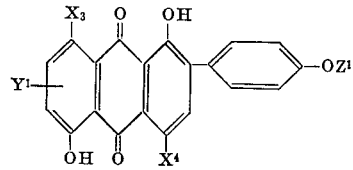

wherein $X^3$ and $X^4$ are independently selected from the class consisting of amino and hydroxy; $Y^1$ is selected from the class consisting of lower alkyl and benzyl; and $Z^1$ is selected from the class consisting of hydrogen and lower alkyl.

The mixtures of water-insoluble anthraquinone dyestuffs, as hereinbefore defined, are valuable for dyeing textile materials comprising synthetic fibers, for example polyamides such as polyhexamethylene adipamide, cellulose esters such as secondary cellulose acetate and cellulose triacetate, polymers and copolymers of acrylonitrile such as polyacrylonitrile, polyolefines such as polypropylene, and particularly polyesters such as polyethylene terephthalate. For dyeing such textile materials it is preferred to use the mixtures of water-insoluble anthraquinone dyestuffs in a finely divided form which may be obtained by milling the dyestuffs with water and a dispersing agent, for example the sodium salt of a formaldehyde naphthalene sulphonic acid condensate. If desired, the so-obtained dispersed aqueous paste of the dyestuff may be dried to form a re-dispersible powder which may be obtained in a non-dusting form by any of the processes known for non-dusting powders.

The mixtures of water-insoluble anthraquinone dyestuffs, as hereinbefore defined, have very good affinity for textile materials comprising polyester fibers, on which they have excellent fastness properties, for example to washing, steam-pleating, sublimation at high temperatures (i.e. dry heat treatments) and to light.

If desired the said mixtures of water-insoluble anthraquinone dyestuffs can be used in the form of mixtures with other water-insoluble dyestuffs, particularly water-insoluble dyestuffs of the anthraquinone or azo series, such as are described in British Pat. Specification Nos. 806271, 835819, 840903, 847175, 852396, 852493, 859899, 865328, 872204, 894012, 908656, 909843, 910306, 913856, 919424, 944513, 944722, 953887, 959816, 960235 and 961412.

The invention is illustrated but not limited by the following examples in which the parts and percentages are by weight.

EXAMPLE 1

A mixture of 10.8 parts of 4:8-diamino-1:5-dihydroxy-2-(4'-hydroxyphenyl)anthraquinone and 500 parts of a 1.5 percent aqueous solution of sodium hydroxide is stirred for 30 minutes at 40° C., in an atmosphere of nitrogen. 6.5 parts of sodium hydrosulphite are then added and the mixture stirred for a further 15 minutes at 40° C. Twenty parts of acetic acid are then added and the leuco derivative of said anthraquinone compound is filtered off and washed with cold water.

The resulting moist solid is stirred with 250 parts of water and 250 parts of ethanol at 80° C. in an atmosphere of nitrogen and 10 parts of a 34 percent aqueous solution of formaldehyde (3.8 molecular proportions) and 16.8 parts of a 40 percent aqueous solution of sodium hydroxide are then added. The resulting mixture is stirred for 30 minutes at 80° C., then cooled to 50° C. and 15 parts of acetic acid are added. The dyestuff which is precipitated is then filtered off, washed with water and dried.

The resulting dyestuff comprises a mixture of 4:8-diamino-1:5-dihydroxy-2-(4'-hydroxyphenyl)-6-(or 7-)methylanthraquinone, 1:4:5:8-tetrahydroxy-2-(4'-hydroxyphenyl)-6-(or 7-) methylanthraquinone and 4-(or 8-)amino-1:5:8-(or 1:5:4-)-trihydroxy-6-(or 7-)methyl-2-(4-hydroxyphenyl)anthraquinone.

When dispersed in aqueous medium the dyestuff dyes polyester textile materials in deep reddish shades which possess excellent fastness to light and to dry heat treatments.

When the above mixture is stirred for only 10 minutes at 80° C., instead of for 30 minutes at 80° C., the resulting product contains more of the 4:8-diamino-1:5-dihydroxy-2-(4'-hydroxyphenyl)-6-(or 7-)methylanthraquinone and correspondingly less of the other components, and the resulting dyestuff is somewhat greener in shade.

On the other hand when the reaction period is extended up to 2½ hours the resulting product contains less of the 4:8-diamino-1:5-dihydroxy-2-(4'-hydroxyphenyl)-6-(or 7-)-methylanthraquinone and correspondingly more of the other components, and this dyestuff is somewhat redder in shade.

EXAMPLE 2

In place of the 10.8 parts of the anthraquinone compound used in Example 1 there are used 11.4 parts of 4:8-di(methylamino)-1:5-dihydroxy-2-(4'-hydroxyphenyl)anthraquinone whereby a similar mixture of dyestuffs is obtained which, when dispersed in aqueous medium, dyes polyester textile materials in blue shades possessing excellent fastness to light and to dry heat treatments.

EXAMPLE 3

The process described in Example 1 is repeated except that after adding the 6.5 parts of sodium hydrosulphite the mixture is stirred for 30 minutes instead of for 15 minutes. The resulting mixture of dyestuffs, which contains less 4:8-diamino-1:5-dihydroxy-2-(4'-hydroxyphenyl)-6-(or 7-)-methylanthraquinone than the mixture of dyestuffs obtained in Example 1, dyes polyester textile materials in redder shades than are obtained in Example 1.

EXAMPLE 4

10.8 parts of 4:8-diamino-2-(4'-hydroxyphenyl)-anthraquinone are converted to the leuco compound as described in the first paragraph of Example 1, and the resulting leuco compound is stirred with 200 parts of water at 95° C. Seven parts of benzaldehyde (2.2 molecular proportions) are then added, and the mixture is stirred for 30 minutes at 95° C. The mixture is then cooled to 50° C., 20 parts of potassium metabisulphite and 20 parts of sodium bicarbonate are added, and the precipitated dyestuff is filtered off, washed with water and dried.

The resulting dyestuff comprises a mixture of 4:8-diamino-1:5-dihydroxy-2-(4'-hydroxyphenyl)-6-(or 7-)benzylanthraquinone, 1:4:5:8-tetrahydroxy-2-(4'-hydroxyphenyl)-6-(or 7-)-benzylanthraquinone and 4-(or 8-)amino-1:5:8-(or 1:5:4-)trihydroxy-2-(4'-hydroxyphenyl)-6-(or 7-)benzylanthraquinone.

When dispersed in aqueous medium the dyestuff dyes polyester textile materials in deep reddish-blue shades which possess excellent fastness to light and dry heat treatments.

EXAMPLE 5

In place of the 7 parts of benzaldehyde used in Example 4 there are used 5.5 parts of β-hydroxybutyraldehyde (2.04 molecular proportions) whereby a similar mixture of anthraquinone compounds is obtained having the β-hydroxybutyl group instead of the benzyl group attached to the 6-(or 7-) position of the antrhaquinone nucleus.

When dispersed in aqueous medium the dyestuff of this example dyes polyester textile materials in deep reddish-blue shades which possess excellent fastness to light and to dry heat treatments.

EXAMPLE 6

13.7 parts of 4:8-diamino-1:5-dihydroxy-2-[4'-(β-hydroxyethoxy)phenyl]anthraquinone are converted to the leuco compound by the method described in the first paragraph of Example 1. The resulting leuco compound is stirred with 140 parts of pyridine at 90° C. in a nitrogen atmosphere, 6 parts of benzaldehyde (1.67 molecular proportions) and 16 parts of a 40 percent aqueous solution of sodium hydroxide are added, and the mixture is stirred for 1 hour at 90° C. The mixture is then steam distilled to remove the pyridine, the residue is cooled to 50° C., and the precipitated dyestuff is then filtered off, washed with water and dried.

The resulting dyestuff comprises a mixture of 4:8-diamino-1:5-dihydroxy-2-[4'-(β-hydroxyethoxy)phenyl]-6-(or 7-)-benzylanthraquinone, 4-(or 8-)amino-1:5:8-(or 1:5:4-)trihydroxy-2-[4'-(β-hydroxyethoxy)phenyl]-6-(or 7-)benzylanthraquinone and 1:4:5:8-tetrahydroxy-2-[4'-(β-hydroxyethoxy)phenyl]-6-(or 7-)-benzylanthraquinone.

When dispersed in aqueous medium the dyestuff so obtained dyes polyester textile materials in deep reddish-blue shades possessing excellent fastness to light and to dry heat treatments.

EXAMPLE 7

In place of the 7 parts of benzaldehyde used in Example 4 there are used 3.5 parts of benzaldehyde (1.1 molecular proportions) whereby a dyestuff having similar properties is obtained.

The following table gives further examples of the mixtures of anthraquinone dyestuffs of the invention which are obtained by reacting the leuco compounds prepared from the anthraquinone compounds listed in the second column of the table with the aldehydes listed in the third column of the table by methods similar to those described in the preceding examples. The resulting dyestuffs all give blue shades when applied to polyester textile materials.

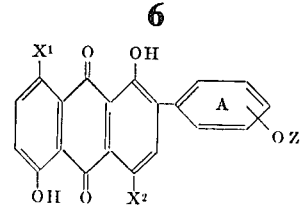

wherein $X^1$ and $X^2$ are independently selected from the class consisting of amino, hydroxy and lower alkylamino; Y is selected from the class consiting of lower alkyl, hydroxy lower alkyl, benzyl, hydroxybenzyl, lower alkyl benzyl, chlorobenzyl and lower alkoxy benzyl; Z is selected from the class consisting of hydrogen, lower alkyl, hydroxy lower alkyl and lower alkoxy lower alkyl; and any substituents on the benzene ring A are selected from the class consisting of chlorine and lower alkyl which mixture is obtained by treating in an inert atmosphere a leuco derivative of an antrhaquinone compound of the formula:

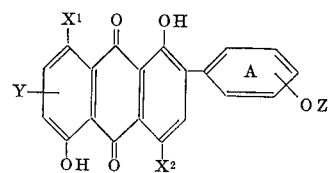

| Example | Anthraquinone compound | Aldehyde |
|---|---|---|
| 8 | 4:8-diamino-1:5-dihydroxy-2-(4'-hydroxyphenyl)anthraquinone | Acetaldehyde. |
| 9 | do | n-Propionaldehyde. |
| 10 | do | o-Chlorobenzaldehyde. |
| 11 | do | m-Chlorobenzaldehyde. |
| 12 | do | p-Chlorobenzaldehyde. |
| 13 | do | m-Methylbenzaldehyde. |
| 14 | do | p-Methylbenzaldehyde. |
| 15 | do | p-Methoxybenzaldehyde. |
| 16 | do | m-Hydroxybenzaldehyde. |
| 17 | do | Salicylaldehyde. |
| 18 | 4:8-diamino-1:5-dihydroxy-2-(4'-methoxyphenyl)anthraquinone | Formaldehyde. |
| 19 | do | Acetaldehyde. |
| 20 | do | Benzaldehyde. |
| 21 | do | β-Hydroxybutyraldehyde. |
| 22 | do | m-Chlorobenzaldehyde. |
| 23 | do | p-Methylbenzaldehyde. |
| 24 | 4:8-diamino-1:5-dihydroxy-2-(4'-methoxyphenyl)anthraquinone | p-Methoxybenzaldehyde. |
| 25 | 4:8-diamino-1:5-dihydroxy-2-[4'-hydroxyethoxy)phenyl]-anthraquinone. | Formaldehyde. |
| 26 | do | Acetaldehyde. |
| 27 | do | β-Hydroxybutyraldehyde. |
| 28 | do | o-Chlorobenzaldehyde. |
| 29 | do | n-Propionaldehyde. |
| 30 | 4:8-diamino-1:5-dihydroxy-2-[4'-hydroxy-3'-methylphenyl]-anthraquinone. | Formaldehyde |
| 31 | do | Benzaldehyde. |
| 32 | do | Acetaldehyde. |
| 33 | 4:8-diamino-1:5-dihydroxy-2-[4'-hydroxy-3'-chlorophenyl]-anthraquinone. | Formaldehyde. |
| 34 | do | Benzaldehyde. |
| 35 | do | Acetaldehyde. |
| 36 | do | β-Hydroxybutyraldehyde. |
| 37 | 4:8-di(methylamino)-1:5-dihydroxy-2-(4'-hydroxyphenyl)-anthraquinone. | Acetaldehyde. |
| 38 | do | Benzaldehyde. |
| 39 | do | β-Hydroxybutyraldehyde. |
| 40 | do | p-Methoxybenzaldehyde. |
| 41 | 4:8-di(methylamino)-1:5-dihydroxy-2-(4'-methoxyphenyl)-anthraquinone. | Formaldehyde. |
| 42 | do | Acetaldehyde. |
| 43 | do | n-Propionaldehyde. |
| 44 | do | Benzaldehyde. |
| 45 | 4:8-di(methylamino)-1:5-dihydroxy-2-[4'-(β-hydroxyethoxy)phenyl]-anthraquinone. | Do. |
| 46 | do | Acetaldehyde. |
| 47 | do | Formaldehyde. |
| 48 | 4:8-di(methylamino)-1:5-dihydroxy-2-[4'-hydroxy-3'-methylphenyl]-anthraquinone. | Do. |
| 49 | do | Benzaldehyde. |
| 50 | 4:8-di(methylamino)-1:5-dihydroxy-2-[4'-hydroxy-3'-chlorophenyl]-anthraquinone. | Do. |
| 51 | do | Formaldehyde. |
| 52 | 4:8-diamino-1:5-dihydroxy-2-[4'-(β-methoxyethoxy)phenyl]-anthraquinone. | Do. |

We claim:
1. A mixture of water-insoluble anthraquinone dyestuffs of the formula:

wherein A, $X^1$, $X^2$ and Z have the same meanings as above, with from 1 to 5 molecular proportions, per molecular proportion of said leuco compound, of an aldehyde selected from the group consisting of formaldehyde, a lower alkanal, a hydroxy lower alkanal, benzaldehyde, a hydroxybenzaldehyde, a chlorobenzaldehyde, a lower alkyl benzaldehyde and a lower alkoxy benzaldehyde, to produce said mixture in an aqueous alkaline medium having a pH of between 9 and 13 at a temperature between 40° C. and the boiling point of the reaction mixture, said reaction being carried out for a period of time in the range of 10 minutes to 3 hours.

2. The mixture of water-insoluble dyestuffs of claim 1 wherein the leuco derivative of 1:5-dihydroxy-4:8-diamino-2-(4'-hydroxyphenyl)anthraquinone is employed.

3. The mixture of water-insoluble dyestuffs of claim 1 wherein the leuco derivative of 1:5-dihydroxy-4:8-diamino-2-(4'-methoxyphenyl)anthraquinone is employed.

* * * * *